(12) United States Patent
Zieher et al.

(10) Patent No.: US 11,413,840 B2
(45) Date of Patent: Aug. 16, 2022

(54) DEVICE FOR TRANSFERRING FOLDING BOXES

(71) Applicant: Uhlmann Pac-Systeme GmbH & Co. KG, Laupheim (DE)

(72) Inventors: Daniel Zieher, Ummendorf (DE); Wolfgang Rodi, Laupheim/Baustetten (DE)

(73) Assignee: Uhlmann Pac-Systeme GmbH & Co. KG, Laupheim (DE)

(*) Notice: Subject to any disclaimer, the term of this patent is extended or adjusted under 35 U.S.C. 154(b) by 417 days.

(21) Appl. No.: 15/818,170

(22) Filed: Nov. 20, 2017

(65) Prior Publication Data
US 2018/0148206 A1 May 31, 2018

(30) Foreign Application Priority Data
Nov. 29, 2016 (EP) .................................. 16201166

(51) Int. Cl.
*B31B 50/76* (2017.01)
*B31B 50/80* (2017.01)
(Continued)

(52) U.S. Cl.
CPC ............ *B31B 50/76* (2017.08); *B31B 50/804* (2017.08); *B65B 43/185* (2013.01);
(Continued)

(58) Field of Classification Search
CPC ..... B65B 43/185; B65B 43/265; B65B 43/30; B65B 43/305; B65B 43/52; B31B 50/804;
(Continued)

(56) References Cited

U.S. PATENT DOCUMENTS 3,343,466 A * 9/1967 Sherman ................. B31B 50/00
493/312
4,194,442 A * 3/1980 Martelli ................. B65H 3/085
271/95
(Continued)

FOREIGN PATENT DOCUMENTS

EP 0 434 961 A1 7/1991
EP 1 310 354 A1 5/2003

OTHER PUBLICATIONS

International Search Report, International Serial No. 16201166.2, dated Jun. 6, 2017, 5 pages.

*Primary Examiner* — Sameh Tawfik
(74) *Attorney, Agent, or Firm* — Dickinson Wright PLLC (57) ABSTRACT

A device for transferring folding boxes has a suction member arrangement, which has suction members and is supported rotatably around a stationary first rotational axis. The suction members transport a folding box through the device along a first path. The suction members are supported rotatably around a nonstationary second rotational axis. The device also has an opposing suction member arrangement, which comprises at least one opposing suction member. The suction members and the at least one opposing suction member cooperate in a box-opening area in such a way that they at least partially open the folding box. At least in the box-opening area, the at least one opposing suction member is arranged radially inside the suction members with respect to the stationary first rotational axis.

8 Claims, 8 Drawing Sheets

(51) Int. Cl.
| | |
|---|---|
| *B65B 43/30* | (2006.01) |
| *B65B 43/52* | (2006.01) |
| *B65B 43/18* | (2006.01) |
| *B65B 43/26* | (2006.01) |
| *B65G 47/06* | (2006.01) |
| *B65G 47/91* | (2006.01) |
| *B65G 59/04* | (2006.01) |
| *B31B 110/35* | (2017.01) |
| *B31B 100/00* | (2017.01) |
| *B31B 120/30* | (2017.01) |

(52) U.S. Cl.
CPC ............ *B65B 43/265* (2013.01); *B65B 43/30* (2013.01); *B65B 43/305* (2013.01); *B65B 43/52* (2013.01); *B65G 47/06* (2013.01); *B65G 47/91* (2013.01); *B65G 59/04* (2013.01); *B31B 2100/0022* (2017.08); *B31B 2110/35* (2017.08); *B31B 2120/302* (2017.08); *B65G 2201/025* (2013.01)

(58) Field of Classification Search
CPC ...... B31B 2100/0022; B31B 2120/302; B31B 2110/35; B31B 50/76; B31B 50/78; B31B 50/784; B31B 50/787; B31B 50/802; B65G 47/06; B65G 47/91; B65G 59/04; B65G 2201/025

USPC .......................................................... 493/123
See application file for complete search history.

(56) References Cited

U.S. PATENT DOCUMENTS

| | | | | |
|---|---|---|---|---|
| 5,061,231 | A * | 10/1991 | Dietrich | B65B 43/185 |
| | | | | 271/95 |
| 5,473,868 | A * | 12/1995 | Antonio | B65B 43/345 |
| | | | | 493/309 |
| 5,514,068 | A * | 5/1996 | Calvert | B31B 50/00 |
| | | | | 493/312 |
| 5,662,577 | A * | 9/1997 | Reuteler | B65B 43/18 |
| | | | | 493/315 |
| 6,913,568 | B2 * | 7/2005 | Frank | B31B 50/80 |
| | | | | 493/309 |
| 7,404,788 | B2 * | 7/2008 | Monti | B65B 43/305 |
| | | | | 493/309 |
| 9,126,382 | B2 * | 9/2015 | Krueger | B31B 5/80 |
| 9,260,212 | B2 * | 2/2016 | Monti | B65B 43/185 |
| 2004/0089517 | A1 * | 5/2004 | Fochler | B65B 43/185 |
| | | | | 198/468.01 |
| 2005/0281646 | A1 * | 12/2005 | Knuppel | B65G 47/848 |
| | | | | 414/408 |
| 2010/0171258 | A1 * | 7/2010 | Schneider | B65H 3/0875 |
| | | | | 271/12 |

* cited by examiner

DEVICE FOR TRANSFERRING FOLDING BOXES

RELATED APPLICATIONS

The present disclosure claims the benefit of an priority to European Patent Application No. EP 161 201 166.2 filed Nov. 29, 2017, the entire contents of which are incorporated herein by reference.

BACKGROUND

The present disclosure relates to a device for transferring folding boxes.

Devices of this type are used to remove flat folding-box blanks, i.e., cut-to-size, prefolded, and possibly glued or assembled folding box blanks, from a magazine; to transfer them to an appropriate transport means such as to compartments of a conveyor chain; and to open the flat, folding box blanks during this transfer. After that, the folding boxes can be filled with the desired product.

An example of a device of this type for transferring folding boxes is known from U.S. Pat. No. 4,518,301. The suction members responsible for transport are fastened to suction member arms, which are themselves rotatably supported on a planetary carrier, which rotates around a horizontal center axis. The suction members remove folding box blanks from a folding box magazine, and during the rotation of the planetary carrier around a bearing axis of the suction member arms, they also rotate the folding box blanks downward and then push them against fixed links of a conveying device in a direction opposite to the transport direction of the conveying device, as a result of which the folding boxes are opened. When the folding boxes are opened in this way, the high relative velocities between a folding box and the conveying device at the time the blank makes contact with the fixed link cause strong forces to act on the folding box, so that it can be damaged or deformed. The suction member arms are driven by roller star units, which are connected to the suction member arms and travel around on the inside circumference of a cam disk, so that the rotational movement around the horizontal center axis and the rotational movement around the bearing axis of the suction member arms are superimposed on each other. As a result, the suction member arms travel along a hypocycloidal path adapted to the transfer and opening of the folding boxes.

To reduce the stress on the folding boxes when they make contact with the link or other driver elements of the transport means or of the conveying device, transfer devices are described in, for example, US 2012/0228086 A1 and U.S. Pat. No. 5,061,231. These devices provide opposing suction members in the area of the paths along which the folding boxes travel through the transfer device. The opposing suction members are arranged on the side of the folding boxes opposite the suction members and make it possible for the folding boxes to be opened by the relative movement between the suction members and the opposing suction members as the boxes are being transported through the transfer device. To facilitate the opening process even more and/or to retain the folding boxes in the opened state, levers which counteract the restoring moment of the folding boxes after they have been opened can be provided near the suction members.

In these devices, relatively high accelerations still act on the folding boxes; these accelerations are the result of the large distance of the path of the folding boxes from the rotational axis of the device and/or the result of the hypocycloidal path of the folding boxes through the device. Because of the arrangement of the opposing suction members including the required mounting devices, suction means, and a drive outside the path of the folding boxes, the transfer device also takes up a relatively large amount of space. Both the arrangement of the opposing suction members and the accelerations and loads which occur therefore limit the transport speed of the folding boxes through the transfer device and thus the output of the transfer device.

BRIEF SUMMARY

It is an object of the present disclosure to provide a device and a method for transferring folding boxes by means of which it is possible in only a modest amount of space to open the folding boxes without harming them while providing high throughput at the same time.

According to an aspect of the present disclosure, the device for transferring folding boxes comprises a stationary first rotational axis and at least one suction member arrangement, which comprises at least one suction member and which is set up to transport a folding box along a first path through the device, wherein the at least one suction member arrangement is supported rotatably around the first rotational axis and the at least one suction member is supported rotatably around a nonstationary second rotational axis. The device also comprises an opposing suction member arrangement comprising at least one opposing suction member, wherein the at least one suction member and the at least one opposing suction member cooperate in a box-opening area in such a way that they at least partially open the folding box. At least in the box-opening area, the at least one opposing suction member is arranged radially inside the at least one suction member with respect to the stationary first rotational axis.

Since the opposing suction member arrangement is arranged inside the rotating suction member arrangements, the amount of space occupied by the transfer device can be significantly reduced. In addition, the path of the folding boxes through the device can be configured so that it does not comprise any cycloidal peaks after the removal of the folding box from the magazine. The folding boxes can therefore be moved continuously during the transport process and do not have to be braked to an almost complete standstill and then accelerated again, as is the case with the conventional transfer devices. This has the effect of protecting the folding boxes from harm and/or offers the advantage that the transport speed through the transfer device and thus the output of the transfer device can be increased without increasing the loads to which the boxes are subjected.

The opposing suction member arrangement is preferably supported rotatably around a third rotational axis such that the at least one opposing suction member can be carried along with the folding box and the contact time between the at least one opposing suction member and the folding box can be increased. A longer contact time between the opposing suction member and the folding box offers the advantage that the folding boxes can be opened more completely and more reliably.

It is also preferred that the opposing suction member arrangement be supported eccentrically around the third rotational axis in such a way that the at least one opposing suction member describes a substantially elliptical second path during a rotation of the opposing suction member arrangement around the third rotational axis. Thus the first and the second paths can be coordinated optimally with each other. Because the elliptical second path is on the inside of the first path around the stationary first rotational axis, the opposing suction member gradually approaches the folding box being transported through the device until it is close enough to the surface of the box to grasp it. In the next phase, the distance between the suction member and the opposing suction member increases gradually in the area in which the suction member and the opposing suction member are simultaneously grasping the folding box, as a result of which the folding box is opened up.

The opposing suction member arrangement also preferably comprises at least one linear guide. This guides the opposing suction member together with the eccentric bearing along the preferred elliptical path around the third rotational axis. This measure also makes it possible to ensure that the opposing suction member is always at least substantially upward-facing. In other words, a center axis of the suction member, which is defined as being perpendicular to its suction surface, is always oriented at an angle to the vertical in the range from 0° to ±80°, preferably in the range of 0° to ±60°. The opposing suction member can thus be returned quickly to its starting position, where it is ready to open a new folding box, as a result of which the throughput of folding boxes can be significantly increased. This further prevents the opposing suction member from being present in an area where it could interfere with the path of the folding boxes when it is not required to open a folding box.

A first suction surface of the suction member and a second suction surface of the opposing suction member are preferably oriented so that, in the box-opening area, they are substantially facing toward each other and are directly opposite each other. As a result, the folding boxes to be transported and opened can be held between the suction member and the opposing suction member while the suction surfaces of the suction member and of the opposing suction member are each in contact with opposite lateral surfaces of the folding box. The folding box is thus opened as the first suction surface of the suction member and the second suction surface of the opposing suction member move away from each other.

In one embodiment, the at least one suction member arrangement is supported in such a way that, during a rotation around the stationary first rotational axis, the second rotational axis describes a third path, which is circular. In this way, the suction member arrangement can be especially easily supported and driven, e.g., on a carrier continuously rotating around the stationary first rotational axis, whereas at the same time the desired, preferably noncircular, first path of the suction members can be realized in the simplest way possible. In particular, only slight accelerations act on the suction member arrangement.

In another embodiment, the at least one suction member arrangement comprises at least one lever, which is arranged next to the at least one suction member and which is supported pivotably around a fourth rotational axis. Levers of this type are usually also called "overexpansion flappers" and serve to assist with the opening or unfolding of the folding box, i.e., to overexpand the box and to support the folding box in the opened state in opposition to the restoring moment acting in the creases on the folding box. "Overexpansion" in this context means that the folding box is unfolded in such a way that, between the lateral surface of the folding box which is connected to the suction member and the lateral surface of the folding box on which the lever is acting, an internal angle of less than 90° is produced. In the folded-together state, i.e., the state of the folding box when it is removed from the box magazine, this angle is approximately 180°. As a result of this "overexpansion", the restoring moment, which acts on the folding box as a result of the folding and gluing of the box, is partially equalized, so that the folding box can be processed more effectively during the following operations. In addition, the folding box can be held by the lever in the desired opened position until it is transferred to the downline conveying device.

The at least one lever is preferably supported pivotably between a starting position and an ending position, wherein the lever, when in the starting position, is arranged in such a way that it does not intersect a plane defined by the first suction surface, and, when in the ending position, is arranged in such a way that it does intersect this plane. When in the starting position, therefore, the lever does not touch the folding box to be transported, which the suction member in question is grasping. The lever therefore exerts no influence on the box. When the lever is pivoted into the ending position, however, it comes in contact with the folding box, specifically with a lateral surface located between the lateral surface which is in contact with the suction member and the lateral surface which is in contact with the opposing suction member; the lever can therefore assist with the opening of the folding box. Depending on the concrete application and the requirements, the ending position can be reached at the point when the lever has overexpanded the folding box, that is, when the above-defined internal angle is less than 90°; or it can be reached when the folding box has been fully opened, i.e., when the above-defined internal angle between the lateral surfaces of the folding box is approximately 90°. It is also possible for the lever to assume an ending position in which this internal angle between the lateral surfaces is greater than 90°. Any intermediate position of the lever can also be realized.

The first, the second, and the third rotational axes are preferably parallel to each other and are horizontal. It is also preferable for the fourth rotational axis to be parallel to the first, second, and third rotational axes as well. This makes it easy to superimpose the movements around the individual rotational axes, as a result of which a simplified kinematics can be realized.

According to another aspect of the present disclosure, a method or transferring folding boxes to a conveying device by means of a transfer device comprises:
  providing the transfer device having at least one suction member and at least one opposing suction member;
  moving the at least one suction member to a folding box to be transferred;
  exerting suction on the folding box by means of the at least one suction member and thus producing a connection between the folding box and the suction member;
  jointly moving the at least one suction member and the folding box through the transfer device along a first path of the at least one suction member;
  bringing the at least one suction member and the folding box into the vicinity of the at least one opposing suction member, wherein the at least one opposing suction member is arranged radially inside the suction member relative to the stationary first rotational axis;
  simultaneously exerting suction on the folding box by means of the at least one opposing suction member and the at least one suction member in the box-opening area;
  moving the at least one suction member and the at least one opposing suction member away from each other in the box-opening area during the simultaneous exertion of suction in such a way that they at least partially open the folding box;

disconnecting the at least one opposing suction member from the at least partially opened folding box;

transferring the folding box from the at least one suction member to the conveying device; and disconnecting the at least one suction member from the folding box.

In this way, the folding box can be moved by the transfer device very safely to a conveying device, wherein a compact structure of the transfer device is achieved at the same time.

The opposing suction member preferably moves along a second path. The first and second paths preferably proceed in such a way that they first approach each other until both the suction member and the opposing suction member are connected to the folding box and then move away from each other, thus opening the folding box, after which the opposing suction member ultimately disconnects from the folding box. The opposing suction member is then moved back to its original position so that it is ready to grasp the next folding box. The movement of the opposing suction member preferably proceeds along an elliptical second path, wherein the opposing suction member can move continuously, in pulsating fashion, or possibly at intervals separated by resting phases.

Each of the first and second paths preferably forms a closed curve. This is especially advantageous with respect to the guidance, support, control, and drive of the elements, because it is easier to configure these functions for endless movements.

While the folding box is being opened in the box-opening area, a first suction surface of the at least one suction member and a second suction surface of the at least one opposing suction member are preferably in effective contact with the folding box. The effective contact is preferably achieved by a nonpositive connection based on the suction forces of the suction member and opposing suction member.

It is preferable for the folding box to be moved continuously by the transfer device to the conveying device. It is also especially advantageous for the speed and direction of the folding box in the transfer device during the transfer process to be substantially the same as the speed and direction of the conveying device. As a result of the continuous movement of the folding box, it is possible to move the box very safely. In particular, acceleration peaks and phases of rapid acceleration are avoided.

DETAILED DESCRIPTION OF THE DRAWINGS AND THE PRESENTLY PREFERRED EMBODIMENTS

Figure 1:
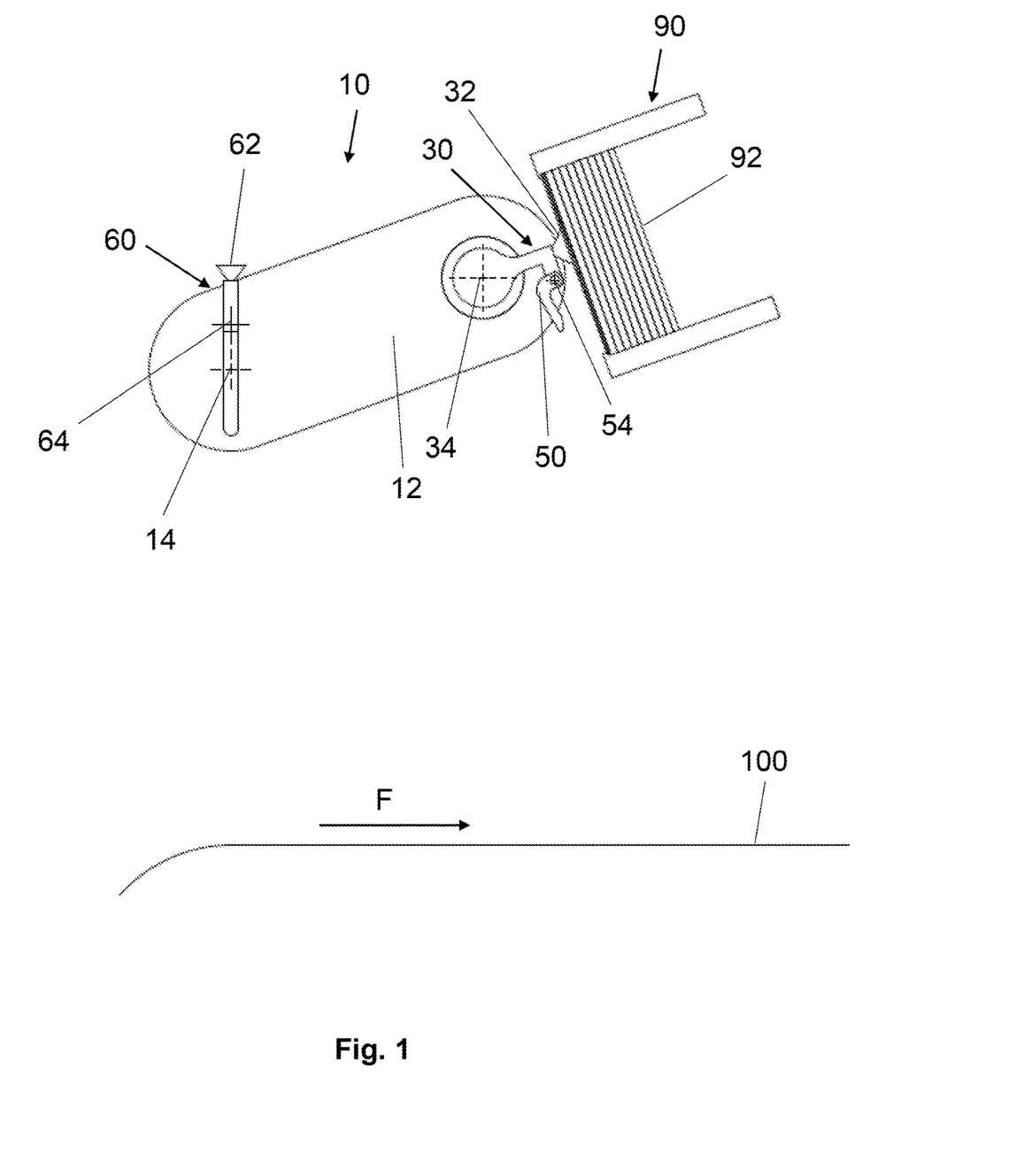
FIG. 1 is a schematic view of essential components of a device for transferring folding boxes according to an embodiment of the present disclosure.

FIG. 1 shows in schematic fashion the essential components of an embodiment of a device 10 according to the present disclosure for transferring folding boxes 92 from a folding box magazine 90 to a conveying device 100. The expression "folding box" is used to designate both the folded blank of a folding box and the folding box in the opened state.

As an alternative to the folding box magazine 90, it is also possible to provide some other type of box-providing device, such as one which provides the folding boxes 92 as blanks in a stationary manner or a device such as a conveyor belt, a conveyor chain, or a rail system, which conveys the blanks continuously into position, such devices comprising means for picking up and carrying the folding boxes 92. The arrangement of the device 10, of the folding box magazine 90, and the conveying device 100 relative to each other as shown here is merely illustrative and can be adapted as appropriate to the concrete situation.

The device 10 is used to transfer folding boxes 92, which, after they have been stamped out of a raw material (such as paper or cardboard) and glued or assembled, are usually provided or delivered in a folded state as blanks to the conveying device 100, from which the folding boxes 92 are sent on in a conveying direction F to additional processes such as the filling of the folding boxes 92 with a product. During the transfer of the folding boxes 92 to the conveying device 100 by means of the device 10, the folding boxes 92 must be at least partially opened, so that they can be transferred to the conveying device 100 in an at least partially opened state on which the subsequent processes can effectively operate. For this purpose, the device 10 comprises at least one suction member arrangement 30 and an opposing suction member arrangement 60. The suction member arrangement 30 can be fastened to or supported in a carrier 12 of the device 10. The carrier 12 is supported in turn in such a way that it can rotate around a stationary first rotational axis 14. The stationary first rotational axis 14 is preferably horizontal and perpendicular to the plane of the drawing in FIG. 1.

The suction member arrangement 30 comprises at least one suction member 32 and is set up to transport a folding box 92 through the device 10 along a certain path. For this purpose, the suction member 32 comprises a first suction surface 36, by means of which it can exert suction on a folding box 92 from the folding box magazine 90. The suction member 32 applies negative pressure or vacuum at the first suction surface 36 and thus produces a suction force, which leads to a nonpositive connection between the first suction surface 36 of the suction member 32 and the folding box 92. After the folding box 92 has been removed from the folding box magazine 90, the suction member 32 moves the folding box 92 through the device 10 along a first path 320 (not shown) of the suction member 32. The suction member arrangement 30 is supported in such a way that the entire suction member arrangement 30 can rotate around the stationary first rotational axis 14 and the at least one suction member 32 can rotate around a non-stationary second rotational axis 34. The entire suction member arrangement 30 or certain components of that arrangement, including the suction member 32, can also rotate around the second rotational axis 34. The second rotational axis 34 is preferably horizontal and perpendicular to the plane of the drawing in FIG. 1.

In the case shown here, the suction member arrangement 30 with the carrier 12 can rotate counterclockwise around the stationary first rotational axis 14, and the suction member 32 can simultaneously rotate clockwise around the second rotational axis 34. In this way, it is achieved that the suction member 32 conveys the folding box 92 into the active area of the opposing suction member arrangement 60. The exact sequence of movements can be derived from FIGS. 5a-5h. It should be obvious that the rotational directions can be adapted to the concrete conditions, in particular to the surrounding machines.

The opposing suction member arrangement 60 comprises at least one opposing suction member 62. The active area of the opposing suction member arrangement 60 is the area in which the suction force generated by the opposing suction member 62 at the second suction surface 66, e.g., by means of negative pressure or vacuum, acts on the folding box 92. When the folding box 92 is close enough to the opposing suction member 62, the suction member will also start to pull on the folding box 92 and will ideally establish a nonpositive connection between the second suction surface 66 and the surface of the folding box 92. Thus the suction member arrangement 30 and the opposing suction member arrangement 60 are both simultaneously connected to the folding box 92, wherein the movement of the suction member 32 and the opposing suction member 62 away from each other has the effect of opening the folding box 92. This area, in which both the suction member 32 and the opposing suction member 62 are connected to the folding box 92 is defined as the "box-opening area". In this box-opening area, the first and second suctions surfaces 36, 66 are therefore substantially facing toward each other and are directly opposite each other, so that they can hold the folding box 92 between them. As soon as the folding box 92 has been opened sufficiently, the opposing suction member 62 separates from the folding box 92, and the at least partially opened folding box 92 is transported farther along toward the conveying device 100 by the suction member 32.

As can be seen in FIG. 1, the opposing suction member 62 is arranged radially inside the suction member 32 with respect to the stationary first rotational axis 14. That is, the distance between the opposing suction member 62 and the first rotational axis 14 is smaller than the distance between the suction member 32 and the first rotational axis 14. According to the present disclosure, this should be true at least in the box-opening area. Preferably, however, the opposing suction member 62 is always radially inside the suction member 32 with respect to the first rotational axis 14. This should be true in particular when the opposing suction member 62 is not fixed but rather configured to be movable. This condition will becomes especially clear on the basis of the sequence of movements described below and illustrated in FIGS. 5a-5h, in which a first path 320 of the suction member 32 and a second path 620 of the opposing suction member 62 can be seen. It is also conceivable, however, that the first path 320 of the suction member 32 could be configured so that the suction member 32 is located closer to the stationary first rotational axis 14 than the opposing suction member 62 in an area outside the box-opening area.

The arrangement of the opposing suction member arrangement 60 radially inside the rotating suction member 32 offers in particular the advantage that the acceleration forces acting on the folding box 92 to be moved can be minimized, because the number of cycloidal peaks which the box must traverse is reduced in comparison to the devices of the prior art; and, in addition, the distance between the folding box 92 and the stationary first rotational axis 14 can be reduced. When the opposing suction members 62 are also movable, furthermore, there is also the possibility that the paths 320, 620 of the suction members 32 and the opposing suction members 62 can be configured in such a way that the time available for the opposing suction to act can be increased, which ensures that the folding box 92 will be opened reliably.

It can also be seen in FIG. 1 that the suction member arrangement 30 comprises a lever 50, which is arranged next to the suction member 32 and is supported on the suction member arrangement 30 so that it can pivot around a fourth rotational axis 54. This lever 50 can assume the function of a so-called "overexpansion flapper", which assists with the opening of the folding box 92 and which in particular is adapted to the function of "overexpanding" the folding box 92 and/or of supporting the folding box 92 in the opened state. It is obvious that the lever 50 can be provided to assist with the opening, with the support of the opened folding box 92, and with the overexpansion of the folding box 92, but its presence is not absolutely necessary to implement the device 10 according to the present disclosure or is it necessary in particular to open the folding boxes 92. The combination of the opposing suction member 62 and the lever 50, however, offers the significant advantage that the folding box 92 will be a reliably opened and overexpanded even in cases where the quality of the folding boxes is poor.

Figure 2:
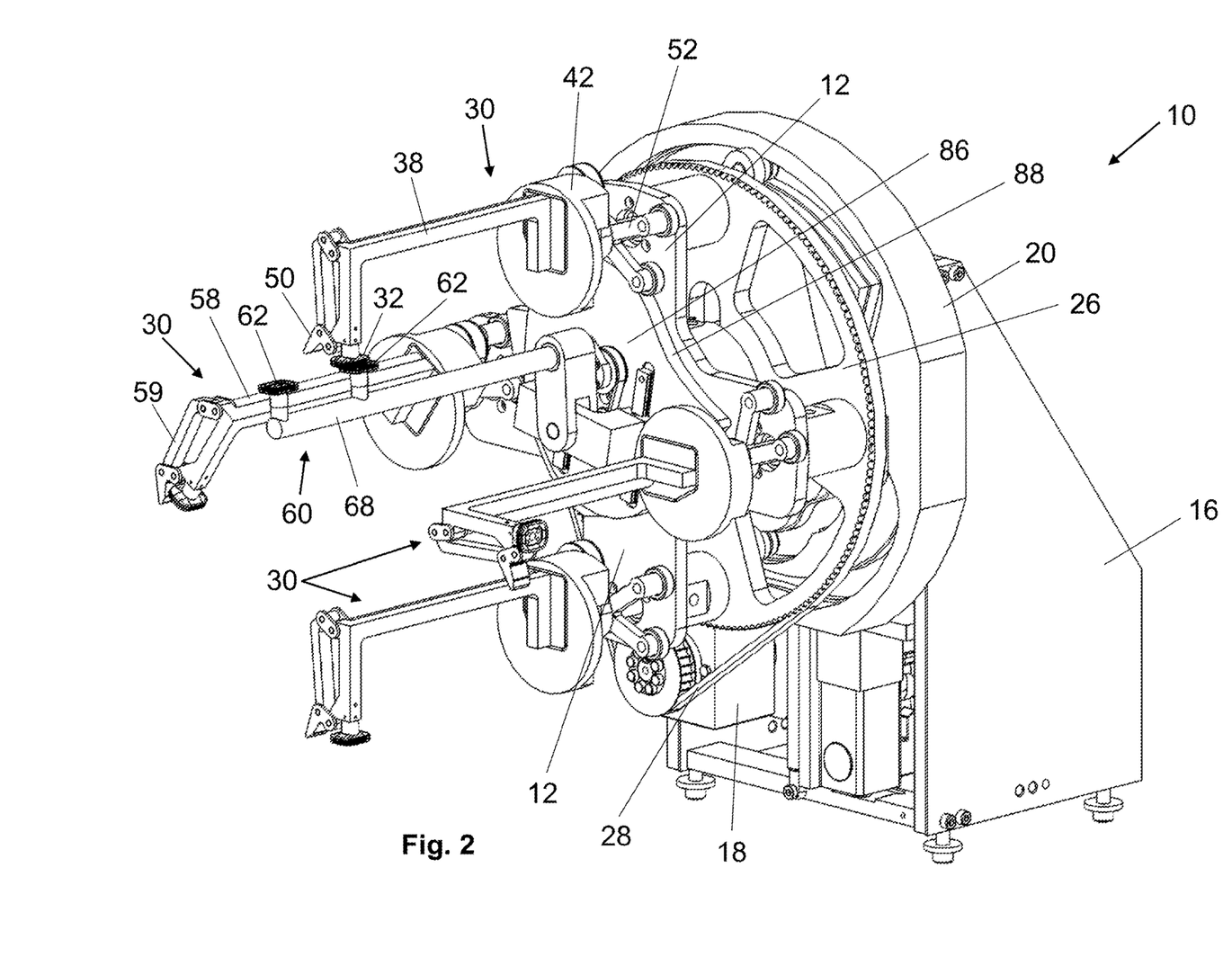
FIG. 2 is a perspective view of an embodiment of the device according to the present disclosure for transferring folding boxes.

FIG. 2 is a perspective view of an exemplary embodiment of the device 10 according to the present disclosure. The device 10 shown in FIG. 2 comprises a total of four suction member arrangements 30, which are arranged at uniform intervals around an opposing suction member arrangement 60. It is obvious that the device 10 can be scaled up or down as appropriate and that more or fewer suction member arrangements 30 can be provided as needed. The use of several opposing suction member arrangements 60 is also conceivable. Details of the suction member arrangements 30 can be derived from FIG. 3, whereas the opposing suction member arrangement 60 is shown by itself in FIG. 4.

The device 10 comprises a stand 16, on which a drive 18 and a guide plate 20 are mounted. The drive 18 drives a drive disk 26, which is supported preferably rotatably (e.g., by means of roller bearings, on a fixed shaft (not shown). The rotational axis of the drive disk 26 and the fixed shaft are preferably coaxial to the stationary first rotational axis 14. The fixed shaft is attached to the stand 16 of the device 10. In the embodiment shown, the torque is transmitted from the drive 18 to the drive disk 26 by means of a toothed belt 28. It is obvious that various types of drives are possible, such as a direct coupling of the drive shaft of the drive 18 to the rotational axis of the drive disk 26 or a transmission of the torque from the drive 18 to the drive disk 26 by means of gearwheels, a gearbox, a V-belt, or similar means.

Figure 3:
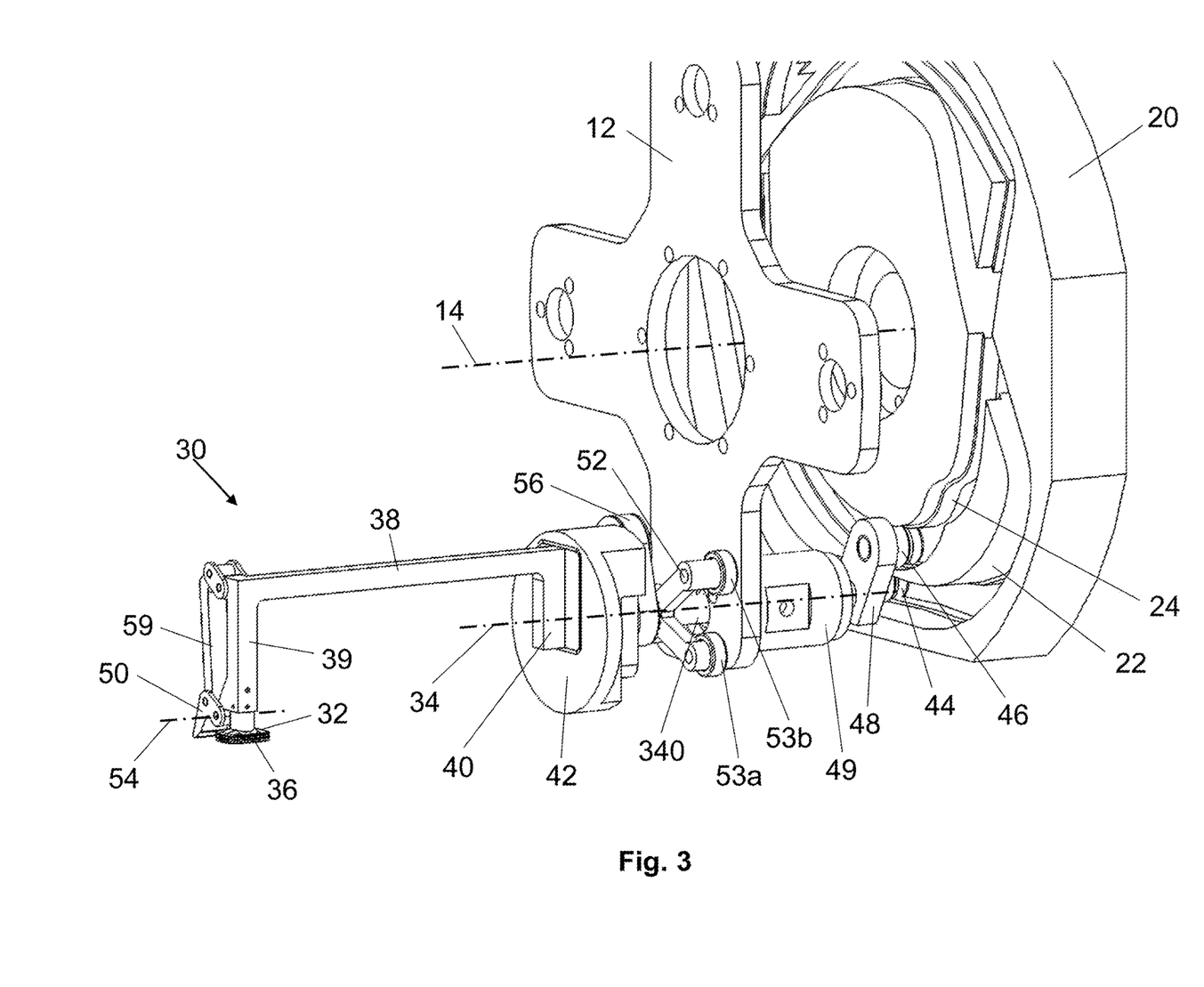
FIG. 3 is a perspective view of a detail of the suction arrangement of the embodiment of the device according to the present disclosure for transferring folding boxes of FIG. 2.

In the embodiment shown here, the carrier 12 of the device 10 has the shape of a turnstile with four arms, wherein a suction member arrangement 30 is arranged on each arm of the turnstile; the carrier 12 comprises a circular opening in the center, as can be seen especially clearly in FIG. 3. The carrier 12 can also be configured as a circular disk if, for example, more than four suction member arrangements 30 are provided. The shape of a cross is superior to that of a disk, however, because it decreases the amount of material required and reduces the mass which must be moved. The carrier 12 is supported rotatably by means of roller bearings, for example, on the fixed shaft, on which the drive disk 26 is also rotatably supported. It is also conceivable that the carrier 12 and the drive disk 26 could each be connected nonrotatably to a common sleeve, and that this sleeve could be supported rotatably on the fixed shaft. Suitably adapted shaft-hub connections for the connection between the sleeve with the drive disk 26 and the carrier 12 are familiar to the expert in the field. It is therefore preferable for the carrier 12 and the drive disk 26 to be connected to each other in such a way that the rotation of the drive disk 26 produced by the drive 18 is transmitted directly to the carrier 12.

The suction member arrangements 30 and the opposing suction member arrangement 60 of the embodiment shown in FIG. 2 are described in detail below with reference to FIGS. 3 and 4.

For the sake of clarity, FIG. 3 shows only one suction member arrangement 30, the carrier 12, and the guide plate 20, whereas the other components visible in FIG. 2 have been omitted. The suction member arrangement 30 comprises at least one suction member 32, which is arranged at the forward end of a suction member arm 38. The suction member arm 38 comprises a substantially gate-shaped or C-shaped form with two parallel webs 39, 40 extending perpendicularly from a connecting piece. The suction member 32 is arranged at a free end of the first web 39, and the second web 40 is connected to a plate-shaped element 42 by the use of screws, for example.

The suction member arrangement 30 also comprises a first guide roller 44 and a second guide roller 46, which are held and guided in a first cam track 22 and a second cam track 24 of the guide plate 20. The first and second cam tracks 22, 24 can be configured to pass all the way through the guide plate 20, or they can be introduced in the form of grooves into the guide plate 20. The guide rollers 44, 46 are configured in such a way that they can roll along the cam tracks 22, 24. The first and second guide rollers 44, 46 are rotatably supported on a retaining element 48, which connects the two rollers 44, 46 together, i.e., which connects the stub shafts on which the rollers are mounted together. The retaining element 48 is connected nonrotatably to a first shaft 340. The longitudinal axis of the first shaft 340 defines the second rotational axis 34, around which the at least one suction member 32, in the present case the entire suction member arrangement 30, is rotatably supported. The end of the shaft 340 opposite the retaining element 48 is connected nonrotatably to the plate-shaped element 42 of the suction member arrangement 30.

In the embodiment shown here, the first shaft 340 is rotatably supported in a bushing 49, which is mounted between the drive disk 26 and the carrier 12. The bushing 49 is preferably permanently connected to the carrier 12 and the drive disk 26 and comprises a bore to hold the first shaft 340 and to support it rotatably, e.g., by means of at least one roller bearing.

Because the carrier 12 and the drive disk 26 can be connected permanently together at several points (e.g., by means of a central sleeve and the bushings 49), the expert can easily see that the carrier 12 and the drive disk 26 can also be configured as a single, one-piece element.

As can be seen in FIG. 3, distance between the first cam track 22 and the second cam track 24 in the guide plate 20 varies over their length, so that the guide rollers 44, 46 of the suction member arrangement 30 guided in the cam tracks 22, 24 shift their positions relative each other in such a way that the retaining element 48 rotates. The distance between the rotational axes of the guide rollers 44, 46 remains constant.

The rotation of the retaining element 48 simultaneously brings about a rotation of the first shaft 340 connected permanently to it around the second rotational axis 34 and thus a corresponding rotation of the entire suction member arrangement 30 around the second rotational axis 34.

During one rotation of the suction member arrangement 30 around the stationary first rotational axis 14, each of the guide rollers 44, 46 travels over the entire length of its cam track 22, 24. It can be seen that, during a rotation of the suction member arrangement 30 around the stationary first rotational axis 14, the first path 320 of the suction member 32 is defined by the course of the first and second cam tracks 22, 24. During a rotation around the stationary first rotational axis 14, the suction member arrangement 30 or at least the suction member 32 preferably rotates twice around the second rotational axis 34, for which reason, in the embodiment shown here, the first cam track 22 and the second cam track 24 intersect. It is obvious that, as a result of the course of the first and second cam tracks 22, 24, the path 320 of the suction member 32 can be adapted in any way desired to the concrete conditions, in particular to the position of the folding box magazine 90 and of the conveyor device 100. Thus, during a rotation around the first rotational axis 14, the suction member 32 or the suction member arrangement 30 can rotate around the second rotational axis 34 as often as desired or stand still relative to the carrier 12 in certain sections of the first path 320. This is achieved by providing the cam tracks 22, 24 with sections which are parallel to each other.

The suction member arrangement 30 can also comprise a crosspiece 52. This is supported on the first shaft 340 so that it can rotate around this shaft, and it comprises substantially the shape of a V with two arms. At the free end of each of the two arms, the crosspiece 52 has a guide roller 53a, 53b. The crosspiece 52 is preferably arranged on the shaft 340 as close as possible to the plate-shaped element 42 of the suction member arrangement 30.

The crosspiece 52 is rotatable independently of the shaft 340 and relative to it. A rotational movement of the crosspiece 52 around the first shaft 340 and thus around the second rotational axis 34 brings about a pivoting movement of the lever 50 around a fourth rotational axis 54. For this purpose, the rotational movement of the crosspiece 52 is transmitted to a second shaft 58 (see FIG. 2) by a transmission mechanism, which, in the embodiment shown, comprises two (gear) wheels and a V-belt or toothed belt 56. This second shaft is substantially parallel to the suction member arm 38. At a forward end of the suction member arm 38, i.e., the end facing away from the crosspiece 52, the second shaft 58 is supported by a joint on the first web 39 of the suction member arm 48. The shaft 58 is connected by a joint to a transmission element 59 in such a way that the rotary movement of the second shaft 58 results in a substantially translational movement of the transmission element 59. At the level of the suction member 32, the lever 50 is supported by a joint on the suction member arm 38, i.e., on its first web 39. The lever 50 is also connected by a joint to the transmission element 59, so that the substantially translational movement of the transmission element 59 causes the lever 50 to pivot around the fourth rotational axis 54. It is obvious that the expert will be able to conceive of alternative transmission mechanisms between the crosspiece 52 and the lever 50. Above all, it is conceivable that the crosspiece 52 could not be supported on the first shaft 340 and/or that its rotational movement could be coupled directly to a rotational movement of a second shaft 58. The support of the crosspiece 52 on the shaft 340 and in particular around the second rotational axis 34, however, offers the advantage that a force which acts on the guide rollers 53a, 53b and causes the crosspiece 52 to rotate generates no additional torque on the suction member arrangement 30 which could cause the relative movement of the arrangement. The expert is familiar with various embodiments of levers 50, i.e., "overexpansion flappers", and the means for their control.

The crosspiece 52 is preferably pretensioned by an elastic element such as a torsion spring into a position which corresponds to a starting position of the lever 50. Alternatively, the lever 50 or one of the transmission elements between the lever 50 and the crosspiece 52 can be pretensioned by an elastic element into a position which corresponds to the starting position of the lever 50. During a rotation of the suction member arrangement 30 around the stationary first rotational axis 14, the guide rollers 53a, 53b meet a control cam 88 of a cam disk 86 (see FIGS. 2 and 4) during a certain phase of the rotation. As can be seen in FIG. 2, at least one of the two guide rollers 53a, 53b rolls along the control cam 88, as a result of which this guide roller 53a, 53b is forced to move out of its starting position. The control cam 88 of the cam disk 86 is configured in such a way that it defines a path for the guide rollers 53a, 53b which results in the rotation of the crosspiece 52 around the second rotational axis 34. As a result, the lever 50 is pivoted into a position which corresponds to an ending position of the lever 50. The slope of the control cam 88, i.e., the inclination of the control cam 88 relative to the unaffected path of the guide rollers 53a, 53b around the first rotational axis 14, can be used to define the rotational speed of the lever 50 around the fourth rotational axis 54. As can be derived from FIGS. 5a-5h, the assistance with the holding and support of the folding box 92 which the lever 50 provides is necessary only in a certain part of the first path 320 of the suction member 32 and the folding box 92 through the device 10. The cam disk 86 and the control cam 88 are therefore arranged and configured in such a way that the lever 50 is pivoted out of its starting position into the ending position in the desired area, whereas, during the remaining part of the rotation of the suction member arrangement 30 around the stationary first rotational axis 14, the lever 50 remains in the starting position, into which it is pretensioned.

The cam disk 86 is substantially stationary. The cam disk is preferably connected to the forward end, i.e. the end facing away from the machine stand, of the fixed shaft on which the carrier 12 and the drive disk 26 are rotatably supported. For example, the cam disk 86 can be screwed to the end of the fixed shaft. The cam disk 86, however, can also be connected in some other way to the stand 16 of the device 10 or to an appropriate housing.

Figure 4:
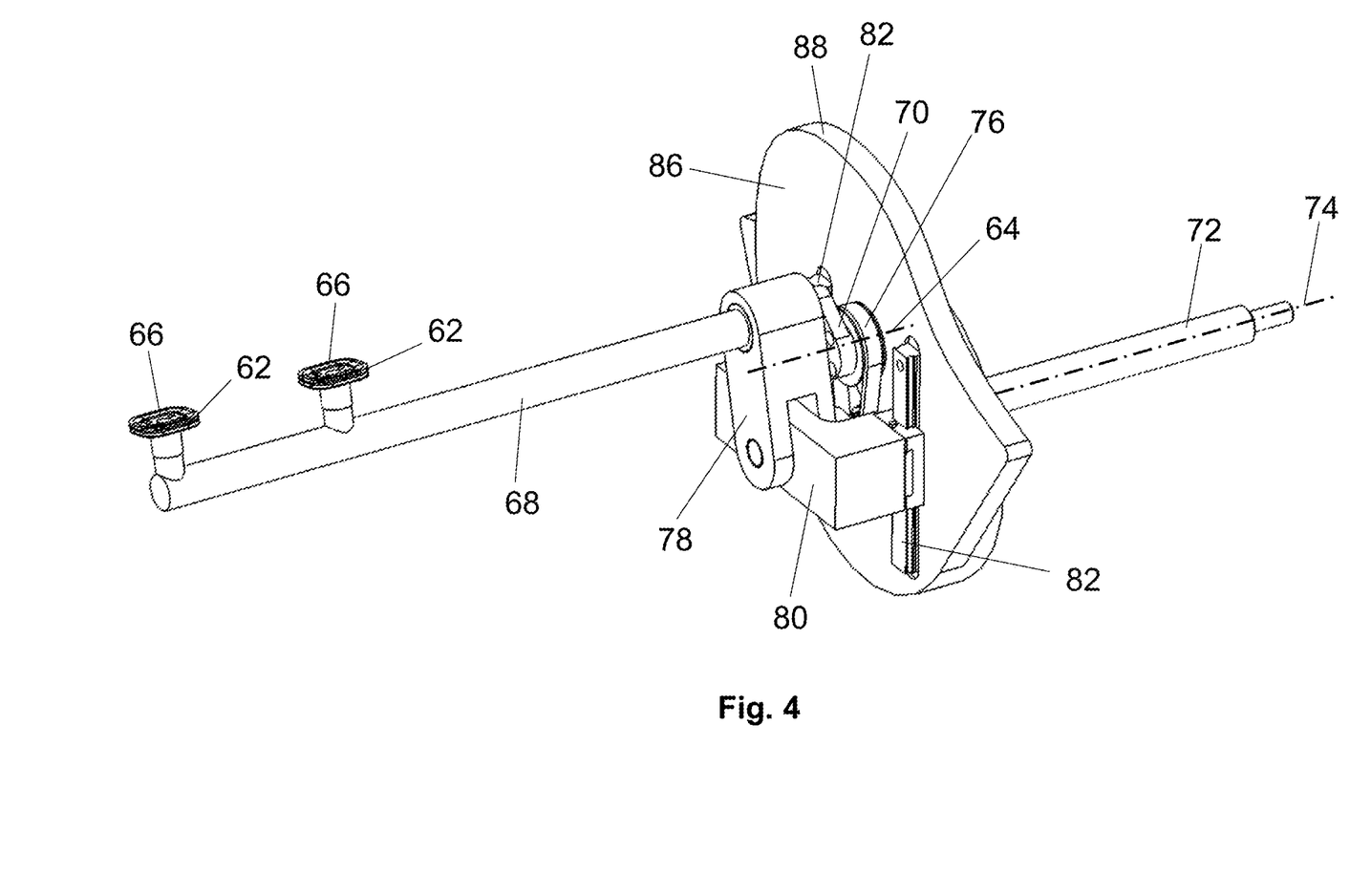
FIG. 4 is a perspective view of a detail of the opposing suction member arrangement of the embodiment of the device according to the present disclosure for transferring folding boxes of FIG. 2.

FIG. 4 shows a perspective detailed view of the opposing suction member arrangement 60 and of the cam disk 86. The opposing suction member arrangement 60, in the embodiment shown here, comprises two opposing suction members 62, which are arranged on an opposing suction member arm 68 a certain distance apart. The second suction surfaces 66 of the opposing suction members 62 are arranged in a plane which allows them both to connect to the same lateral surface of the folding box 92. It is obvious that, if necessary, one opposing suction member 62 or more than two opposing suction members 62 can be also be provided. The opposing suction member arm 68 is preferably connected nonrotatably to a first guide element 78. A cam 70 is rotatably connected to the first guide element 78, preferably on the side of the first guide element 78 facing away from the opposing suction member arm 68. The cam 70 is supported rotatably around the third rotational axis 64. For example, the cam 70 can be supported in the cam disk 86 by a stub shaft or on a shaft whose longitudinal axis is coaxial to the third rotational axis 64. The rotatable connecting point between the cam 70 and the first guide element 78 is eccentric, i.e., arranged a certain distance away from the third rotational axis 64, so that the connecting point moves eccentrically around the third rotational axis 64. The opposing suction member arrangement 60 is therefore supported eccentrically around the third rotational axis 64. Embodiments of the device 10 are also conceivable, however, in which the opposing suction member arrangement 60 is rotatably supported concentrically around a third rotational axis 64 or could even possibly be stationary.

A drive torque is introduced via a third shaft 72, which rotates around a fifth rotational axis 74, and is transmitted by means of a transmission mechanism to the cam 70. Here, for example, the transmission mechanism comprises a belt 76, which transmits the torque from the third shaft 72 to the stub shaft or shaft on which the cam 70 is supported. Here, too, alternative transmission mechanisms can be provided. The third shaft 72 can be driven by transmission of the rotational movement of the drive disk 26 or of the drive 18 to the third shaft 72 by means of a belt or gearbox. A separate drive (not shown) for the third shaft 72 could also be provided. The shaft 72 can for this purpose extend through the cam disk 86 and through the center of the fixed shaft on which the carrier 12 and the drive disk 26 are supported and can be rotatably supported in one of these elements. If the available space and the arrangement of the individual components allow, it is also conceivable that the cam 70 could be supported directly on the third shaft 72. In any case, the arrangement, orientation, and drive speed of the opposing suction member arrangement 60 and thus the path and speed of the movement of the opposing suction members 62 are to be adapted to the path and speed of movement of the folding boxes 92, as can be derived from FIGS. 5a-5h and the associated description.

The first guide element 78, furthermore, is connected pivotably to a second guide element 80. The second guide element 80 is connected in turn to at least one linear guide 82; in the embodiment shown here, it is connected to two linear guides 82. In particular, the second guide element 80 is supported slidably on the at least one linear guide 82. For this purpose, the second guide element 80 comprises at least one recess, which can be configured as a groove, for example, and which serves to accept a rail-shaped linear guide 82. Here, too, alternative embodiments of linear guides can be realized. For example, the second guide element 80 could also comprise one or more extensions, which slide along a groove formed in, for example, the cam disk 86.

The first guide element 78 thus couples the rotational movement generated by the cam 70 with a linear movement, which the linear guidance of the second guide element 80 imposes. As a result, the at least one opposing suction member 62 moves along a desired second path 620, preferably an elliptical path 620. The opposing suction member 62 can be moved continuously or in pulsating fashion along the second path 620, but it could also remain in a standby position until it is moved back into the box-opening area again.

To implement the teaching according to the present disclosure, however, it is also possible that the at least one opposing suction member 62 could remain stationary, in which case the first path 320 of the suction member 32 and the folding box 92 is to be adapted accordingly, so that the folding box 92 first gradually approaches the at least one opposing suction member 62 and then, after the opposing suction member 62 has grasped the folding box 92 by suction, gradually moves away from it. A purely rotatory or pulsating movement of the opposing suction members 62 is also conceivable, wherein the opposing suction members 62 in this case are moved continuously around a circular path or pivot back and forth along a subsection of a circular path.

FIGS. 5a-5h show the sequence of movements of the essential components of the device 10 during a transfer cycle on the basis of a schematic diagram according to FIG. 1. In particular, the first path 320 of the suction member 32, the second path 620 of the opposing suction member 62, and the third path 350 of the second rotational axis 34 are indicated. The first and second paths 320, 620 correspond to projections of the center points of the first and second suction surfaces 36, 66 during a rotation of the suction member 32 and the opposing suction member 62 around the stationary first rotational axis 14. The third path 350 corresponds to the projection of the second rotational axis 34 during a rotation of the second rotational axis 34 around the stationary first rotational axis 14.

The individual steps of the method for transferring folding boxes 92 to a conveying device 100 can also be derived from FIGS. 5a-5h. The arrow F indicates the conveying direction of the conveying device 100; the arrow A indicates the direction of the rotational movement of the suction member 32 or of the suction member arrangement 30 around the second rotational axis 34; and the arrow B indicates the direction of the rotational movement of the suction member arrangement 30 or of the carrier 12 around the stationary first rotational axis 14. In the example shown in FIGS. 5a-5h, the rotational direction A is the clockwise direction, and the rotational direction B is the counterclockwise direction. Accordingly, the conveying direction F is from left to right in the plane of the drawing. The arrangement of the folding box magazine 90 and of the conveying device 100 as well as the directions of the individual movements can be adapted in accordance with the existing situation. The arrangement of the folding box-providing unit, e.g., the folding box magazine 90, relative to the conveying device 100 should be limited only by the need for sufficient space between them to allow for the at least partial opening of the folding boxes 92 by the device 10.

The following description serves to illustrate a possible implementation of the method according to the present disclosure, i.e., of the function of the device 10 according to the present disclosure.

Figure 5A:
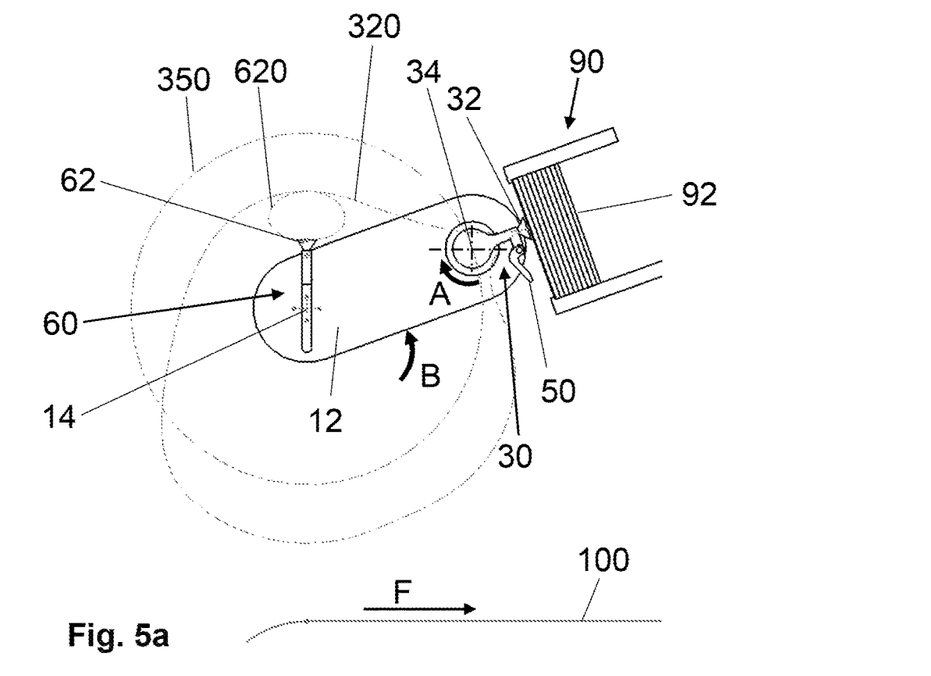
FIGS. 5*a*-5*h* show the sequence of movements of the transfer process on the basis of the schematic view of the components of the embodiment according to the present disclosure for transferring folding boxes of FIG. 1.

FIG. 5a shows the beginning of a movement cycle. The first suction surface 36 of the suction member 32 is in contact with the first of several folding boxes 92 provided in the folding box magazine 90. By means of negative pressure or vacuum, a suction force is generated, which brings about a nonpositive connection between the suction member 32 and the folding box 92. The opposing suction member 62 is located at this point in a standby position or is moving in a standby area, in which it cannot collide with the folding box 92 to be moved.

Figure 5B:
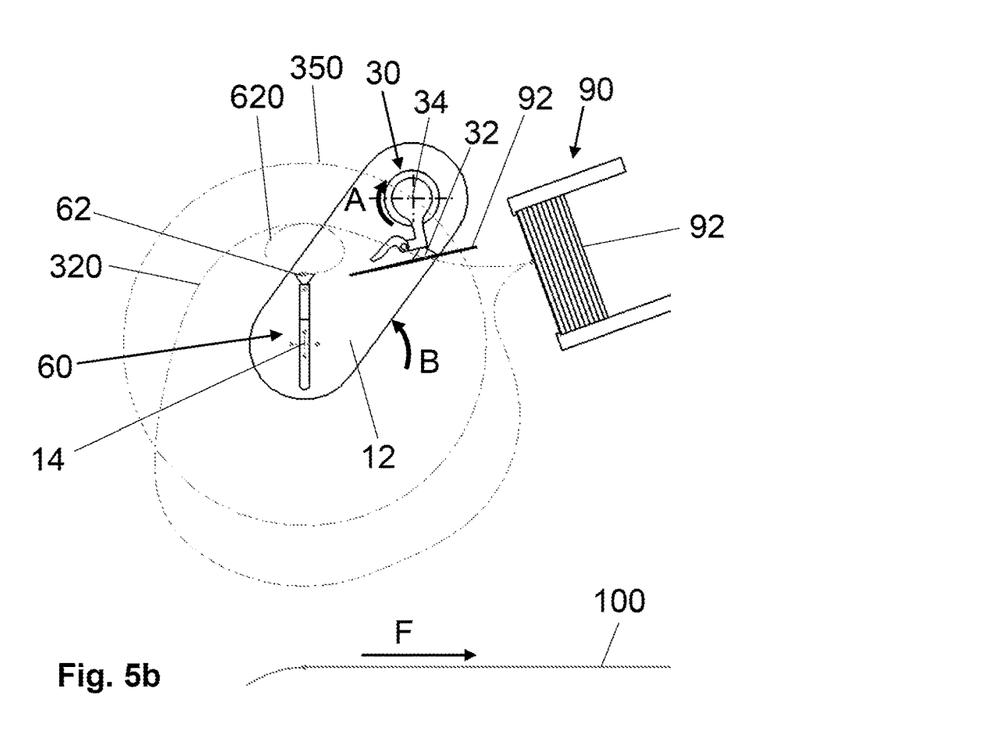

As can be seen in FIG. 5b, the carrier 12 and the suction member arrangement 30 are moving in the counterclockwise direction (arrow B) around the stationary first rotational axis 14. At the same time, at least the suction member 32 is rotating around the second rotational axis 34 in the clockwise direction (arrow A). The folding box 92 is removed from the folding box magazine 90 and carried along the first path 320 by the suction member 32. It is obvious that it is not the entire folding box 92 which moves along the indicated path 320, but rather, as a result of the connection with the suction member 32, it is only the connection point between the folding box 92 and the suction member 32 which follows the first path 320 exactly. As a result of the superimposition of the rotational movement of the suction member arrangement 30 around the first rotational axis 14 and the rotational movement of the suction member arrangement 30 or of the suction member 32 around the second rotational axis 34, the folding box 92 is pivoted inward relative to the third path 350 and relative to the stationary first rotational axis 14. Accordingly, the opposing suction member 62 must remain in a standby area or in a standby position until the folding box 92 has pivoted far enough that the leading edge of the folding box 92 cannot collide with the opposing suction member 62. It is not mandatory that the opposing suction member 62 remain motionless; it is also possible that the opposing suction member 62 could operate in a pulsating manner or even move continuously in a manner coordinated with the movement of the folding box 92. The lever 50 is in the starting position, in which it is not in contact with the folding box 92.

The suction member 32 or the suction member arrangement 30 continues to rotate around the second rotational axis 34 until the suction member 32 is facing inward relative to the third path 350. As can be derived from FIGS. 5c-5f, the suction member 32 is rotated into a position in which a longitudinal axis of the suction member 32 perpendicular to its first suction surface 36 has a substantially radial orientation with respect to the preferably circular third path 360. The suction member 32 remains in this position for now. Accordingly, the suction member arrangement 30 does not rotate around the second rotational axis 34 in the box-opening area. It is also possible, however, that the suction member arrangement 30 could be moving in some suitable way around the rotational axis 34 at all times.

Figure 5C:
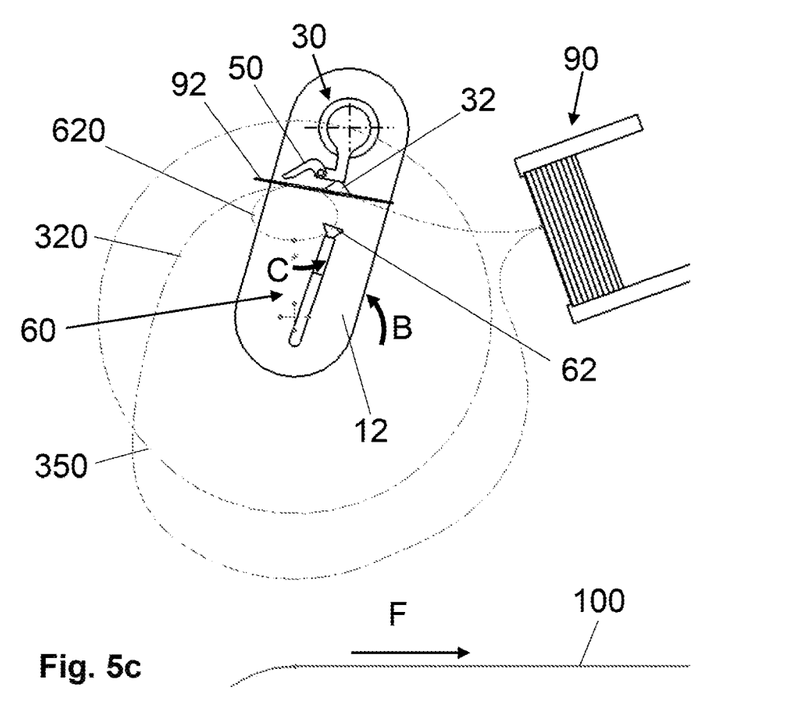

As can be seen in FIG. 5c, the opposing suction member 62 moves along a second path 620 toward the folding box 92 (arrow C) in such a way that a collision of the leading edge of the folding box 92 with the opposing suction member 62 is impossible. In the example shown, the opposing suction member 62 moves along an elliptical second path 620. The sequence of movements of the suction member 32 and of the opposing suction member 62 are coordinated with each other in such a way that the first path 320 and the second path 620 gradually approach each other. They are preferably tangent to each other. The first path 320 and the second path 620 continue to approach each other until the suction surface 36 of the suction member 32 and the suction surface 66 of the opposing suction member 62 rest on the folding box 92. As soon as the second suction surface 66 of the opposing suction member 62 has been moved close enough to the folding box 92, the opposing suction member 62 also grasps the folding box 92 by suction and establishes a nonpositive connection between the folding box 92 and the second suction surface 66. It is this point in the sequence of movements of the suction member 32 and of the opposing suction member 62 that marks the beginning of the box-opening area.

At least one of the two suction members, i.e., either the suction member 32 or the opposing suction member 62, is, or both are, made of an elastic material in the area of the first or second suction surface 36, 66, or this area is in the form of, for example, an elastically supported suction head which comprises the suction surface 36, 66. This ensures that the first and second suction surfaces 36, 66 rest completely on the folding box 92 and prevents the suction member arrangement 30 or the opposing suction member arrangement 60 from buckling when the opposing suction member 62 makes contact with the folding box 92.

Figure 5D:
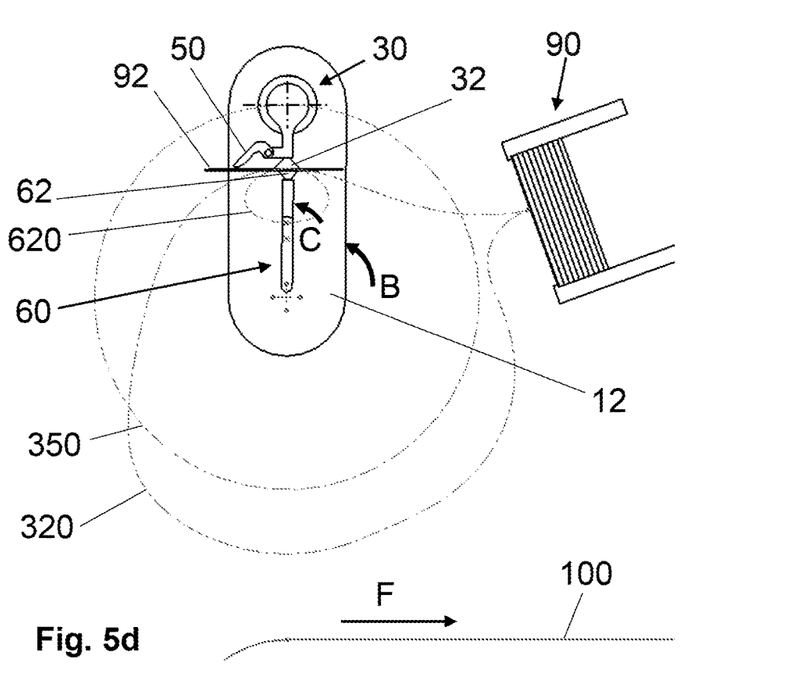
Figure 5E:
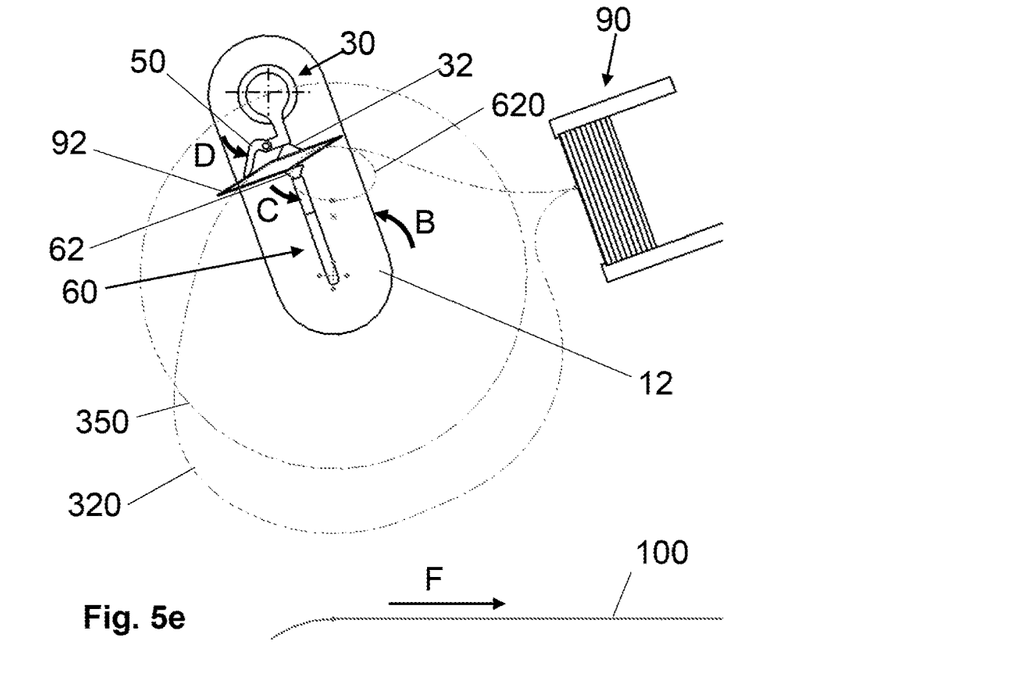

It can be seen in FIG. 5d that both the suction member 32 and the opposing suction member 62 are now connected to the folding box 62 and that the suction member 32 and the opposing suction member 62 are oriented to that they are substantially facing each other. More precisely, in this state the first suction surface 36 and the second suction surface 66 are substantially parallel to each other and a certain distance apart, this distance corresponding substantially to the thickness of the folded folding box 92. The suction member 32 and the opposing suction member 62 rest by their suction surfaces against lateral surfaces of the folding box 92 which would correspond to two opposite sides of the opened folding box. Even at this early stage, the lever 50 can be pivoted away from its starting position, so that it rests against the folding box 92.

During the next phase of the movements (FIG. 5e), the first path 320 and the second path 620 gradually move away from each other in the box-opening area. The distance between the suction member 32 and the opposing suction member 62 thus increases. As a result of the nonpositive connection of the suction member 32 and of the opposing suction member 62 to the folding box 92, the box is pulled apart, i.e. opened. This is the latest point at which the pivoting movement of the lever 50 around the fourth rotational axis 54 (arrow D) can begin.

As can be derived from the figures, the opposing suction member 62 is arranged, at least in the box-opening area, radially inside the suction member 32 with respect to the stationary first rotational axis 14. It is especially preferred that the second path 620 of the opposing suction member 62 be arranged completely inside the first path 320 of the suction member 32.

Figure 5F:
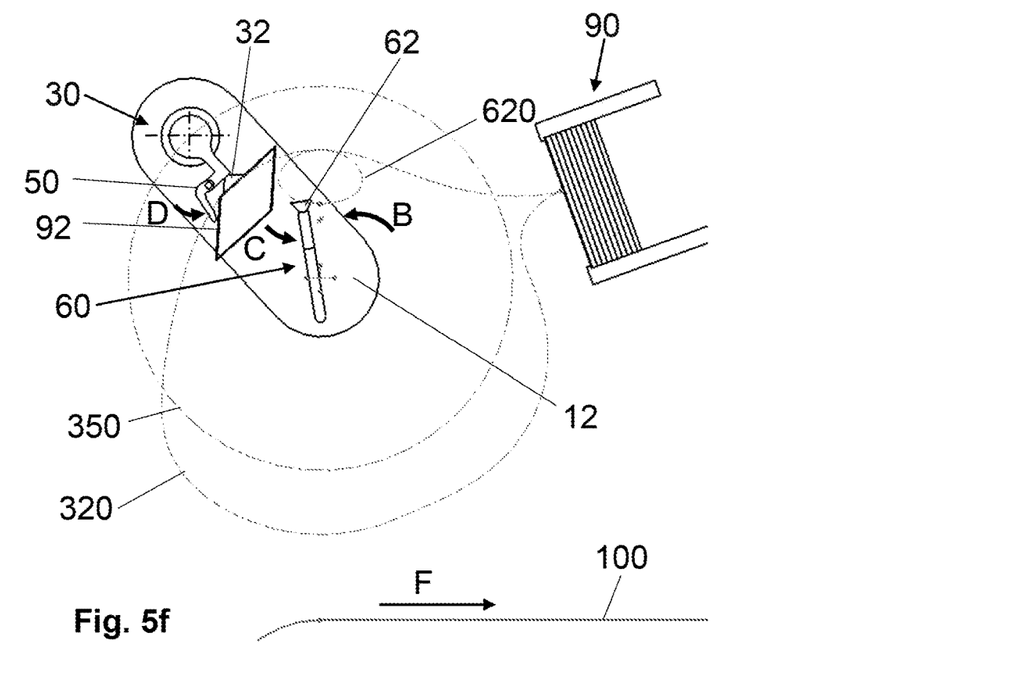
Figure 5G:
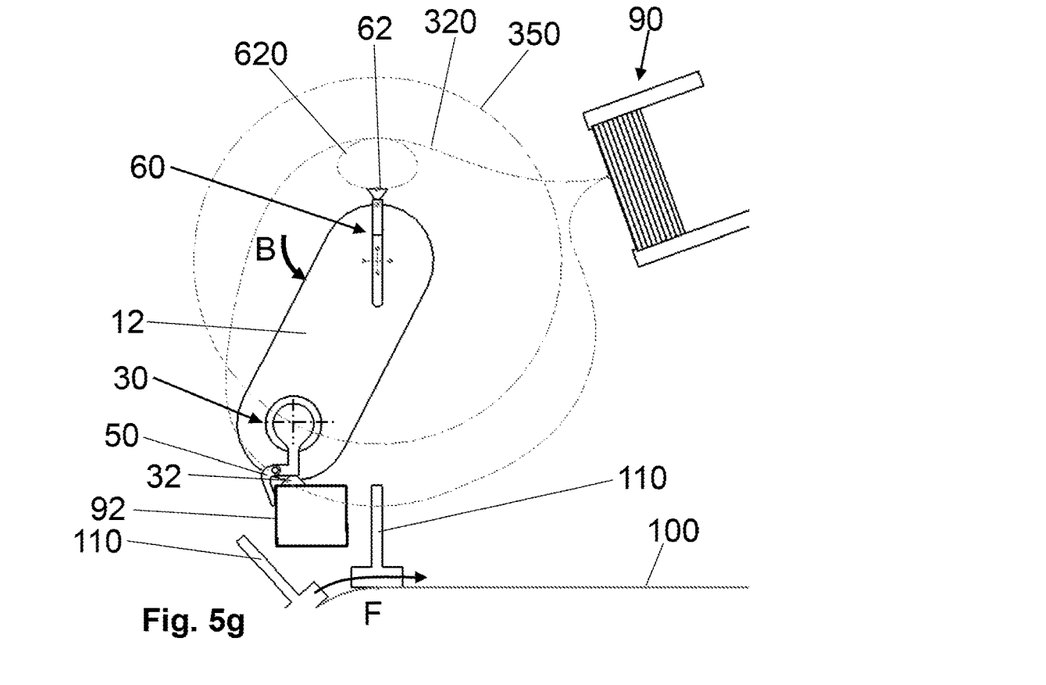
Figure 5H:
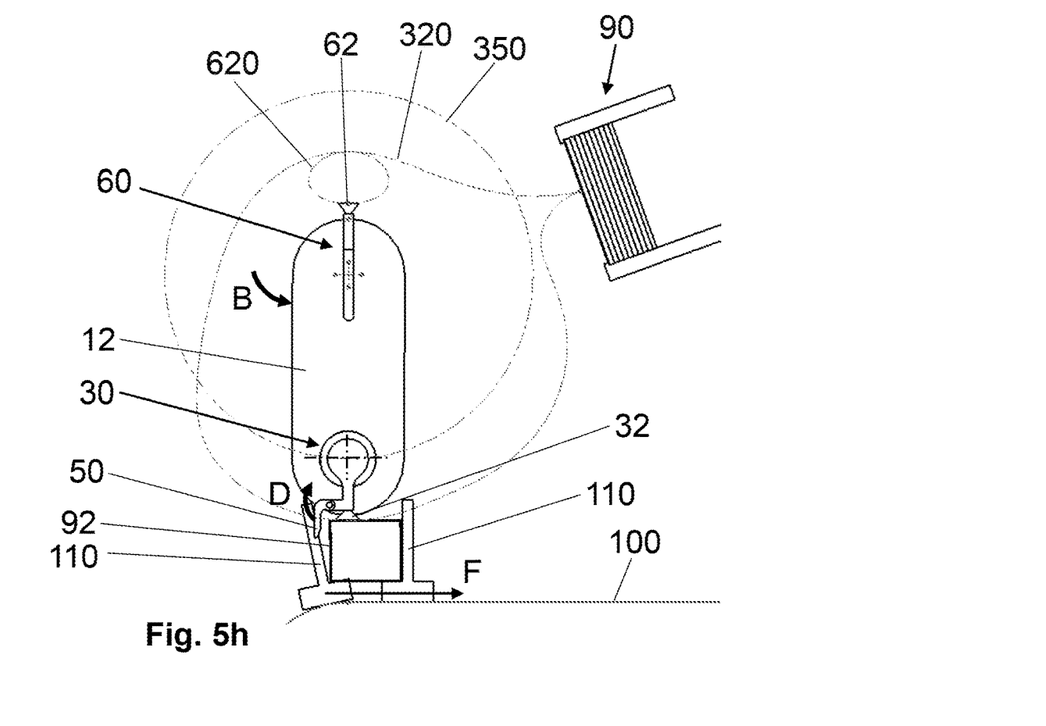

The lever 50 assists with the opening of the folding box 92, wherein at least one contact area of the lever 50 rests against a lateral surface of the folding box 92 located between the lateral surfaces which are connected to the suction member 32 and to the opposing suction member 62. The lever 50 thus prevents the folding box 92 from closing back up again and reduces the amount of suction required to ensure that the folding box 92 will remain securely grasped during the opening phase. The lever 50 can then hold the folding box 92 in a desired position and counteract any restoring moment which may come into play under certain conditions. The lever 50 can also be pivoted further (arrow D) to overexpand the folding box 92. As can be seen in FIG. 5f, the inside angle between the lateral surface of the folding box 92 which is connected to the suction member 32 and the lateral surface which is connected to the lever 50 is initially greater than 90°. As a result of the overexpansion, this inside angle is reduced to an angle of less than 90°. The result is that the restoring moments which act in particular in the creases between the lateral surfaces of the folding box 92 are equalized. The complete opening and/or overexpansion of the folding box 92 can alternatively also be achieved by bringing the box into contact with a fixed link of the device 10 or with an element of the conveying device 100.

As soon as the folding box 92 has been opened to the desired degree, the negative pressure or vacuum in the opposing suction member 62 is decreased. The opposing suction member 62 becomes disconnected from the folding box 92. This is shown in FIG. 5f. The opposing suction member arrangement 60 can now move back again into the standby area or into the standby position. If a plurality of suction member arrangements 30 is provided, the opposing suction member arrangement 60 can also immediately approach the next folding box 92.

The suction member arrangement 30 can now pivot the folding box 92 toward the outside relative to the third path 350. This is done preferably only after the opposing suction member 62 has become disconnected from the folding box 92. The suction member arrangement 30 rotates around the second rotational axis 34 until the orientation of the folding box 92 is adapted to the transfer of the folding box 92 to the conveying device 100.

In the exemplary embodiment shown (FIG. 5g), the conveying device 100 comprises, for example, several slides 110, which move through the conveying device 100 in the conveying direction F. The folding box 92 is preferably transferred to the conveying device in a fully opened state (inside angle between two lateral surfaces equals 90°). To ensure the safest possible transfer, the transfer process proceeds continuously. During the transfer, the translational velocity component of the folding box 92 in the device 10 is preferably the same as the speed at which the folding box 92 will be carried along by the conveying device 100. As soon as the folding box 92 has been accepted by the transport means of the conveying device 100, e.g., by the slides 100 (FIG. 5h), the lever 50 is moved away from the folding box 92 and pivoted back into its starting position. The negative pressure or vacuum in the suction member 32 is reduced, and the suction member 32 releases the folding box 92. The folding box 92 is preferably in contact with both the device 10 and the conveying device 100 at least briefly. Finally, the suction member 32 is moved back along the first path 320 into the starting position, in which it can pick up a new folding box 92, e.g., from the folding box magazine 90.

As can be seen in FIGS. 5a-5h, the first path 320 comprises only one cycloidal peak, namely, at the point where the suction member 32 is brought into contact with the folding box 92 in the folding box magazine 90. Apart from that, the folding box 92 moves along the path 320 without passing through any additional cycloidal peaks, as a result of which the severe stress on the folding box 92 resulting from high accelerations in these types of cycloidal peaks can be reduced or prevented entirely. The folding box 92 is preferably moved continuously through the device 10. For this purpose, the carrier 12 and/or the suction member arrangement 30 move preferably continuously and even more preferably at constant speed around the stationary first rotational axis 14. It is also conceivable, however, that the carrier 12 and/or the suction member arrangement 30 could execute pulsating movement around the first rotational axis 14 in order to slow down critical processes without exerting any significant effect on the machine speed. It is also preferred that the first, second, and third paths 320, 350, 620 each form a closed curve. The third path 350 is preferably circular.

The invention claimed is:
1. A device for transferring folding boxes, comprising:
a stationary first rotational axis;
at least one suction member arrangement, which comprises at least one suction member and which is set up to transport a folding box through the device along a first path, wherein the at least one suction member arrangement is supported rotatably around the stationary first rotational axis, and the at least one suction member is supported rotatably around a nonstationary second rotational axis;
an opposing suction member arrangement, which comprises at least one opposing suction member, wherein, in a box-opening area, a first suction surface of the suction member and a second suction surface of the opposing suction member are arranged substantially facing toward each other and are directly opposite each other, and wherein, in the box-opening area, the first suction surface of the suction member and the second suction surface of the opposing suction member are substantially parallel to each other and a distance apart, wherein the distance corresponds substantially to a thickness of a folded folding box, wherein the at least one suction member and the at least one opposing suction member cooperate in the box-opening area in a way that they at least partially open the folded folding box; and wherein, at least in the box-opening area, the at least one opposing suction member is arranged radially inside the at least one suction member relative to the stationary first rotational axis.

2. The device of claim 1, wherein the opposing suction member arrangement is supported rotatably around a third rotational axis.

3. The device of claim 2, wherein the opposing suction member arrangement is supported eccentrically around the third rotational axis in a way that, during a rotation of the opposing suction member arrangement around the third rotational axis, the at least one opposing suction member describes a substantially elliptical second path.

4. The device of claim 2, wherein the first, the second and the third rotational axes are parallel to each other and are oriented horizontally.

5. The device of claim 1, wherein the opposing suction member arrangement also comprises at least one linear guide.

6. The device of claim 1, wherein the at least one suction member arrangement is supported in a way that, during a rotation around the stationary first rotational axis, the second rotational axis describes a circular third path.

7. The device of claim 1, wherein the at least one suction member arrangement comprises at least one lever, which is arranged next to the at least one suction member and which is supported pivotably around a fourth rotational axis.

8. The device of claim 7, wherein the at least one lever is supported pivotably between a starting position and an ending position, wherein the lever, when in the starting position, is arranged in a way that it does not intersect a plane defined by the first suction surface and, when in the ending position, is arranged in such a way that it does intersect said plane.

* * * * *